United States Patent
Saffar et al.

(10) Patent No.: US 11,361,077 B2
(45) Date of Patent: Jun. 14, 2022

(54) KERNEL-BASED PROACTIVE ENGINE FOR MALWARE DETECTION

(71) Applicant: Dell Products L.P., Round Rock, TX (US)

(72) Inventors: Or Herman Saffar, Ofakim (IL); Yevgeni Gehtman, Modi'In (IL)

(73) Assignee: Dell Products L.P., Round Rock, TX (US)

(*) Notice: Subject to any disclaimer, the term of this patent is extended or adjusted under 35 U.S.C. 154(b) by 102 days.

(21) Appl. No.: 16/865,665

(22) Filed: May 4, 2020

(65) Prior Publication Data

US 2021/0342448 A1 Nov. 4, 2021

(51) Int. Cl.
*G06F 21/56* (2013.01)
*G06F 21/52* (2013.01)

(52) U.S. Cl.
CPC ............ *G06F 21/566* (2013.01); *G06F 21/52* (2013.01); *G06F 2221/034* (2013.01)

(58) Field of Classification Search
CPC .... G06F 21/552; G06F 21/554; G06F 16/245; G06F 2221/034; G06N 20/00
See application file for complete search history.

(56) References Cited

U.S. PATENT DOCUMENTS

| | | | |
|---|---|---|---|
| 2008/0052696 A1* | 2/2008 | Pradadarao | G06F 11/3644 717/130 |
| 2020/0162484 A1* | 5/2020 | Solis Agea | H04L 63/1416 |
| 2021/0064751 A1* | 3/2021 | Li | G06K 9/627 |
| 2021/0105613 A1* | 4/2021 | San Miguel | G06F 11/3476 |

* cited by examiner

*Primary Examiner* — Ashokkumar B Patel
*Assistant Examiner* — William B Jones
(74) *Attorney, Agent, or Firm* — Kirton McConkie; Brian Tucker

(57) ABSTRACT

A kernel-based proactive engine can be configured to evaluate system call functions that are invoked when user-mode objects make system calls. As part of evaluating a system call function, the kernel-based proactive engine can generate a feature vector for the system call function. The kernel-based proactive engine can then analyze the feature vector using a multidimensional anomaly detection algorithm that has been trained using feature vectors of system call functions that are known to be safe. When the evaluation indicates that the feature vector is anomalous, the kernel-based proactive engine can block the system call.

20 Claims, 6 Drawing Sheets

| Number of Steps | Delete Count | Open Count | Create Count | By User | New System | Via Library | ... |
|---|---|---|---|---|---|---|---|
|  |  |  |  |  |  |  |  |

Feature Vector 200

FIG. 2

KERNEL-BASED PROACTIVE ENGINE FOR MALWARE DETECTION

CROSS-REFERENCE TO RELATED APPLICATIONS

N/A

BACKGROUND

Many different techniques exist for detecting malware. For example, signature-based detection is a technique that requires determining that an object (e.g., an executable program, document, image, etc.) is malicious, generating a signature for the object and then distributing the signature to the various malware solutions which can then use the signature to identify instances of the object on a particular computing system. If a signature-based malware solution does not include the signature of a malicious object, it will fail to detect the malicious object.

As another example, behavior-based detection is a technique in which the behavior of an object is evaluated (e.g., in a sandbox) to determine whether it is malicious. For behavior-based detection to be effective, the malware solution must be able to detect any possible improper behavior that an object may perform to accomplish a malicious task. If an object accomplishes a malicious task using a previously unknown behavior, the malware solution may fail to determine that the object is malicious. This is oftentimes the case with so-called zero-day attacks.

The existing malware detection techniques are all limited by the fact that there are infinite ways in which malicious tasks can be accomplished. It is therefore virtually impossible to design a malware solution that can positively detect all improper behavior. As a result, creators of malware remain one step ahead of the existing malware solutions.

BRIEF SUMMARY

Embodiments of the present invention extend to a kernel-based proactive engine for malware detection and to related methods, systems, and computer program products. A kernel-based proactive engine can be configured to evaluate system call functions that are invoked when user-mode objects make system calls. As part of evaluating a system call function, the kernel-based proactive engine can generate a feature vector for the system call function. The kernel-based proactive engine can then analyze the feature vector using a multidimensional anomaly detection algorithm that has been trained using feature vectors of system call functions that are known to be safe. When the evaluation indicates that the feature vector is anomalous, the kernel-based proactive engine can block the system call.

In some embodiments, the present invention may be implemented by a malware detection engine as a method for detecting malware. The malware detection engine can detect that a system call has been made. In response to detecting that the system call has been made, the malware detection engine can monitor execution of a system call function that the system call invokes. In conjunction with monitoring the execution of the system call function, the malware detection engine can create a feature vector for the system call function. The malware detection engine can then compare the feature vector to feature vectors for known-safe system call functions. When the comparison indicates that the feature vector is anomalous, the malware detection engine can block the system call.

In some embodiments, the present invention may be implemented as computer storage media storing computer executable instructions which when executed on a computing system implement a malware detection engine. The malware detection engine can include a handler and an anomaly detector. The handler can be configured to monitor execution of a system call function that is invoked when a system call is made. The handler can be further configured to create a feature vector for the system call function based on the monitoring. The anomaly detector can be configured to receive the feature vector from the handler and to return a score indicative of whether the feature vector is anomalous.

In some embodiments, the present invention may be implemented by a malware detection engine as a method for detecting malware. In response to a system call being made, the malware detection engine can create a feature vector for a system call function that is invoked when the system call is made. The feature vector can define a plurality of features including at least two of: a number of steps feature; a delete count feature; an open count feature; a create count feature; a by user feature; a new system feature; or a via library feature. The malware detection engine can then evaluate the feature vector using a multidimensional anomaly detection algorithm to thereby generate a score indicating whether the feature vector is anomalous. When the score indicates that the feature vector is anomalous, the malware detection engine can block the system call, whereas when the score indicates that the feature vector is not anomalous, the malware detection engine can allow the system call.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only some embodiments of the present invention and are not therefore to be considered limiting of its scope, the present invention will be described and explained with additional specificity and detail through the use of the accompanying drawings in which.

DETAILED DESCRIPTION

Figure 1:
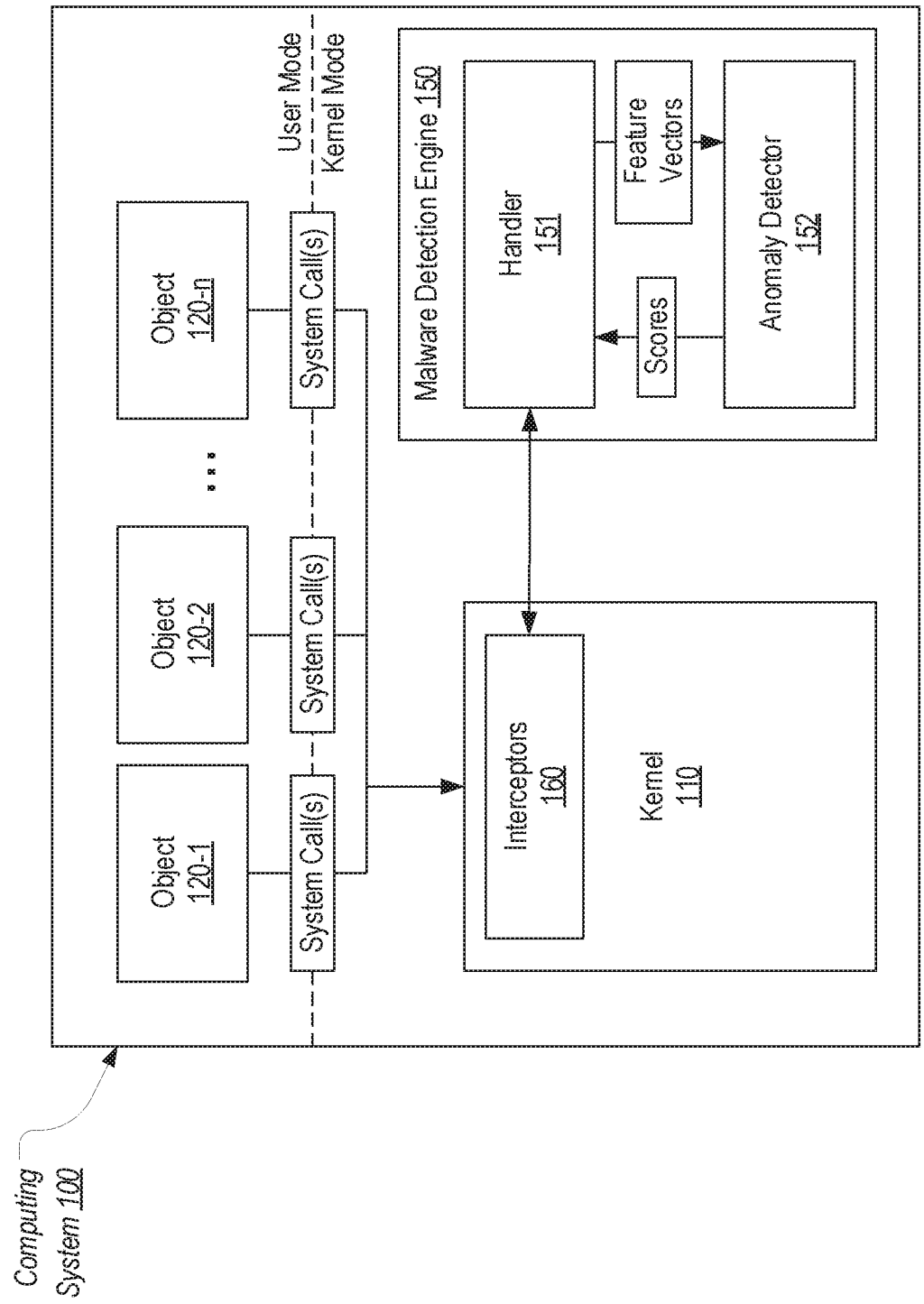
FIG. 1 is a block diagram of a computing system that includes a kernel-based proactive engine for malware detection in accordance with one or more embodiments of the present invention FIG. 2 provides an example of a feature vector that a malware detection engine could employ in one or more embodiments of the present invention.

FIG. 1 illustrates a computing system 100 on which a kernel-based proactive engine for malware detection 150 (or simply malware detection engine 150) is executed. FIG. 1 is intended to provide an overview of how embodiments of the present invention may be implemented. As shown, computing system 100 includes an operating system kernel 110 (or simply kernel 110) and any number of objects 120-1 through 120-$n$ (collectively objects 120) that execute in user mode and may therefore perform system calls to invoke functionality of kernel 110. For purposes of the specification and the claims, the term "system call" should be given its ordinary meaning. For example, a system call may be construed as the mechanism by which a user mode object requests that the kernel of an operating system provide some service to the user mode object. A system call could be in the form of an interrupt (e.g., int 0x80 in Linux) that identifies an entry in the system call table. The term "system call function" will be used to represent the code that is executed to handle a particular system call. A system call function could be the set of instructions that start at an address defined in an entry in the system call table (i.e., the entry point of a system call). For example, an application (or likely a standard library that the application employs) may make a system call that specifies the number 2 to request that a file be opened, and in response, a system call function, sys_open, will be invoked to open the file. The term "known-safe system call function" will be used to represent system call functions that malware detection engine 150 knows are safe. Examples of known-safe system call functions may include the standard system call functions provided by the operating system (e.g., sys_read, sys_write, sys_open, etc. in a Linux x86 architecture or NtReadFile, NtWriteFile, NtOpenFile, etc. in a Windows x86 architecture).

System calls are implemented in different ways depending on the hardware architecture and operating system, among other things. As will become apparent below, embodiments of the present invention can be implemented irrespective of any particular way in which system calls are implemented and on computing devices running a wide variety of operating systems. Therefore, any hardware and/or operating system specific examples that are used to describe embodiments of the present invention should not be viewed as limiting.

As an overview, malware detection engine 150 may be configured to evaluate the execution of a system call function when a system call is made. This evaluation entails creating a feature vector for the system call function and then analyzing the feature vector to determine whether the feature vector is anomalous. When a feature vector is determined to be anomalous, malware detection engine 150 can block the completion of the system call.

In FIG. 1, malware detection engine 150 is depicted as having two primary components, handler 151 and anomaly detector 152. This visual separation of the components is intended to simplify the description but should not be viewed as requiring malware detection engine 150 to have any particular structural or logical arrangement. Instead, malware detection engine 150 should be construed based on the functionality that it performs as described below.

FIG. 1 also shows that malware detection engine 150 employs interceptors 160 to detect when objects 120 make system calls. Interceptors 160 can represent any suitable technique or mechanism by which malware detection engine 150 may be notified when any of objects 120 make a system call and may be given the opportunity to evaluate the corresponding system call function. As one example, interceptors 160 could represent one or more probes of a probing tool (e.g., Kernel Probes or DTrace probes) that malware detection engine 150 registers (e.g., to probe the interrupt instruction that is invoked to make a system call, to probe an instruction that is invoked to jump to a starting address of a system call function, etc.). In any case, regardless of how interceptors 160 may function, handler 151 can be configured to be notified when a system call is made.

The use of interceptors 160 may also enable handler 151 to monitor the execution of the system call function that is invoked whenever any of objects 120 make a system call. For example, when an instruction is probed, the probing tool may enable handler 151 to cause the execution of the system call function to proceed step-by-step, thus enabling handler 151 to evaluate the system call function.

During this evaluation of the system call function, handler 151 can build a feature vector for the system call function and submit the feature vector to anomaly detector 152. Anomaly detector 152 can employ a multidimensional anomaly detection algorithm to generate a score for the feature vector and provide the score back to handler 151. If the score indicates that the system call function is anomalous, handler 151 can block the system call or otherwise prevent it from completing (e.g., by preventing the system call function from returning) and may notify an administrator. On the other hand, if the score indicates that the system call function is not anomalous, handler 151 can allow the system call to be completed.

FIG. 2 provides an example of the structure of a feature vector 200 that may be employed in some embodiments of the present invention. As shown, feature vector 200 may define a number of features that handler 151 can identify while monitoring the execution of a system call function. These features include: a "number of steps feature" that identifies the number of steps that the system call function performs; a "delete count feature" that identifies the number of delete operations the system call function performs (e.g., the number of times the system call function invokes sys_unlink in Linux or NtDeleteFile in Windows); an "open count feature" that identifies the number of open operations the system call function performs (e.g., the number of times the system call function invokes sys_open in Linux or NtOpenFile in Windows); a "create count feature" that identifies the number of create operations the system call function performs (e.g., the number of times the system call function invokes sys_create in Linux or NtCreateFile in Windows; a "by user feature" that identifies whether the system call was made by a user object (as opposed to being made by a system object such as an updater, scheduler, troubleshooter, etc.); a "new system feature" that identifies whether the computing system on which malware detection engine 150 is executing is new; and a "via library feature" that identifies whether the system call function uses a library to invoke a known-safe system call function as opposed to the known-safe system call function being directly invoked. These features represent only a subset of features that could be employed and many other features and combinations of features could be employed in embodiments of the present invention. Additional features include counts for other known-safe system call functions, whether the object making the system call has a valid certificate, whether the object making the system call has a known hash, whether the object making the system call employs valid encryption keys, etc.

Figure 3A:
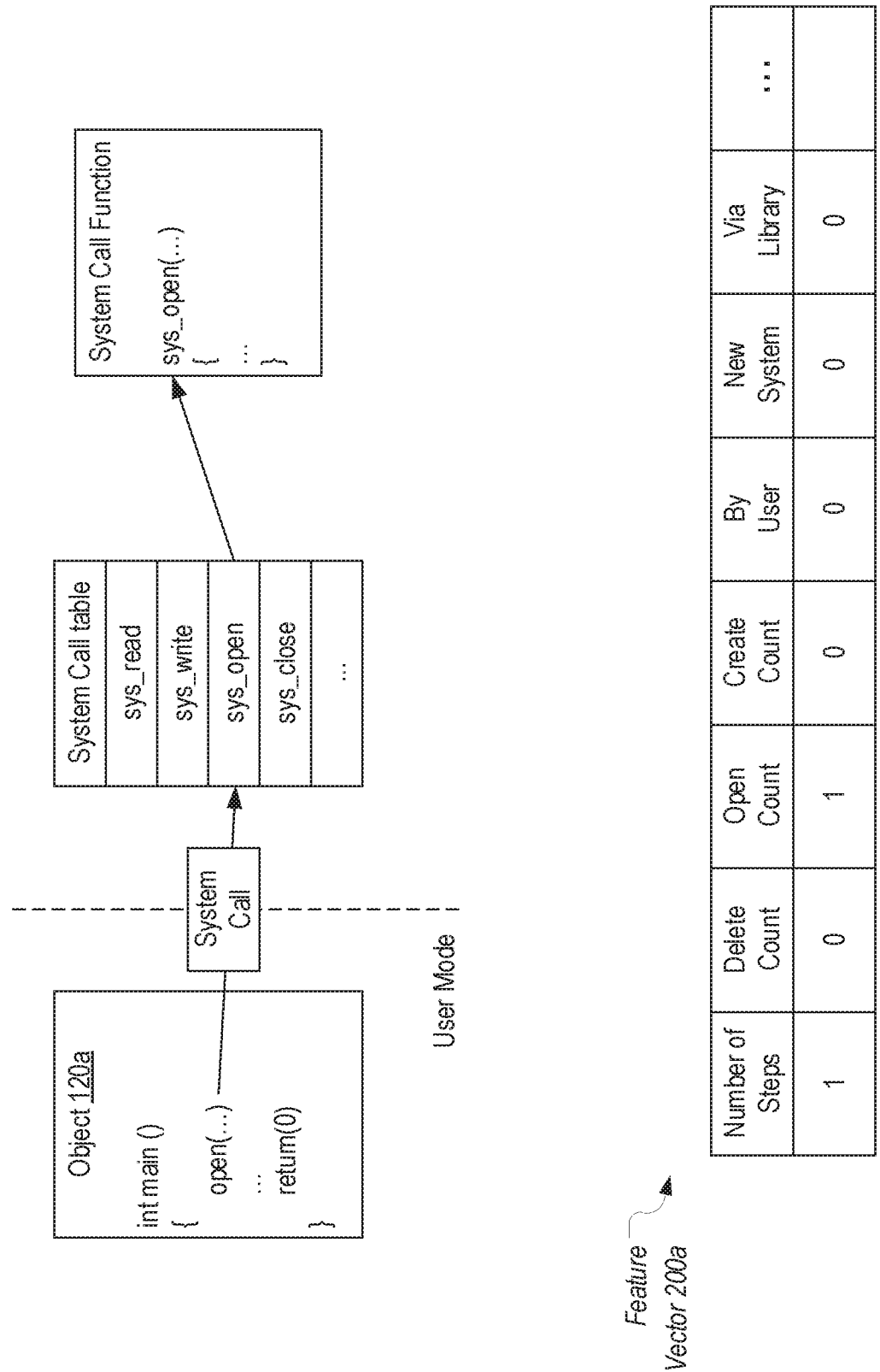
FIG. 3A provides an example of how a known-safe system call function may be invoked and a feature vector that could be generated for the known-safe system call function.
Figure 3B:
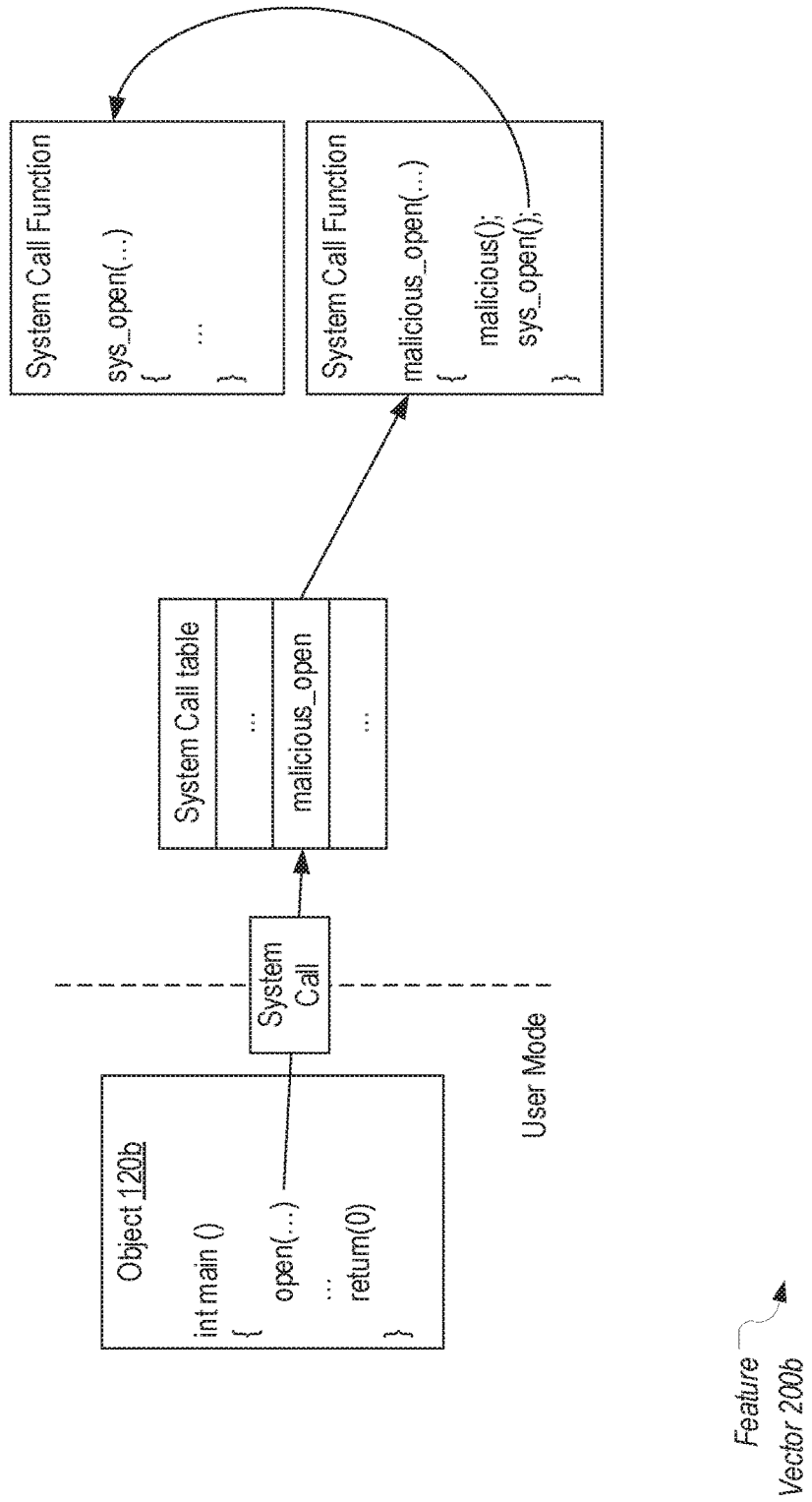
FIG. 3B provides an example of how a system call function that is not known to be safe may be invoked and a feature vector that could be generated for the system call function.

FIGS. 3A and 3B provide two simplified examples of system calls and feature vectors that could be generated when the corresponding system call functions are executed.

FIG. 3A represents the execution of a known-safe system call function. In particular, object 120a is shown as calling the open function which is configured to make a system call. In this example, the system call identifies the entry in the system call table for the standard sys_open system call function. Accordingly, object 120a's system call results in the sys_open system call function being directly invoked. As described above, handler 151 can be notified when object 120a makes the system call and can commence monitoring the execution of the system call function. During this monitoring, handler 151 could determine that the system call function involves a single step—the call to sys_open—which is made directly without first invoking a library. Handler 151 can also determine that the system call function performs a single open but does not perform any deletes or creates. It will also be assumed that object 120a is not a user object and that the system is not new. Accordingly, handler 151 can create feature vector 200a having the number of steps feature and the open count feature set to 1 and the remaining features set to 0.

In contrast, FIG. 3B represents the execution of a system call function that is malicious and may generally represent how a Linux rootkit performs malicious tasks. Object 120b is similarly shown as calling the open function which is configured to make a system call. However, the system call identifies the entry in the system table for a system call function that for illustrative purposes is named malicious_open. Such a result could occur when the system table is maliciously modified. Accordingly, object 120b's system call results in the malicious_open system call function being invoked (as opposed to the known-safe sys_open system call function). As shown, it is assumed that the malicious_open system call function performs some malicious activity prior to invoking the known-safe sys_open system call function. While monitoring the execution of the malicious_open system call function, handler 151 could determine that the system call function involves two steps—the call to malicious_open followed by the call to sys_open. Handler 151 can also determine that the system call function performs a single open, which is made via a library (i.e., the call to sys_open is made by the malicious_open system call function), but does not perform any deletes or creates. It will again be assumed that object 120b is not a user component and that the system is not new. Accordingly, handler 151 can create feature vector 200b having the number of steps feature set to 2, the open count feature and via library feature set to 1 and the remaining features set to 0.

Figure 4:
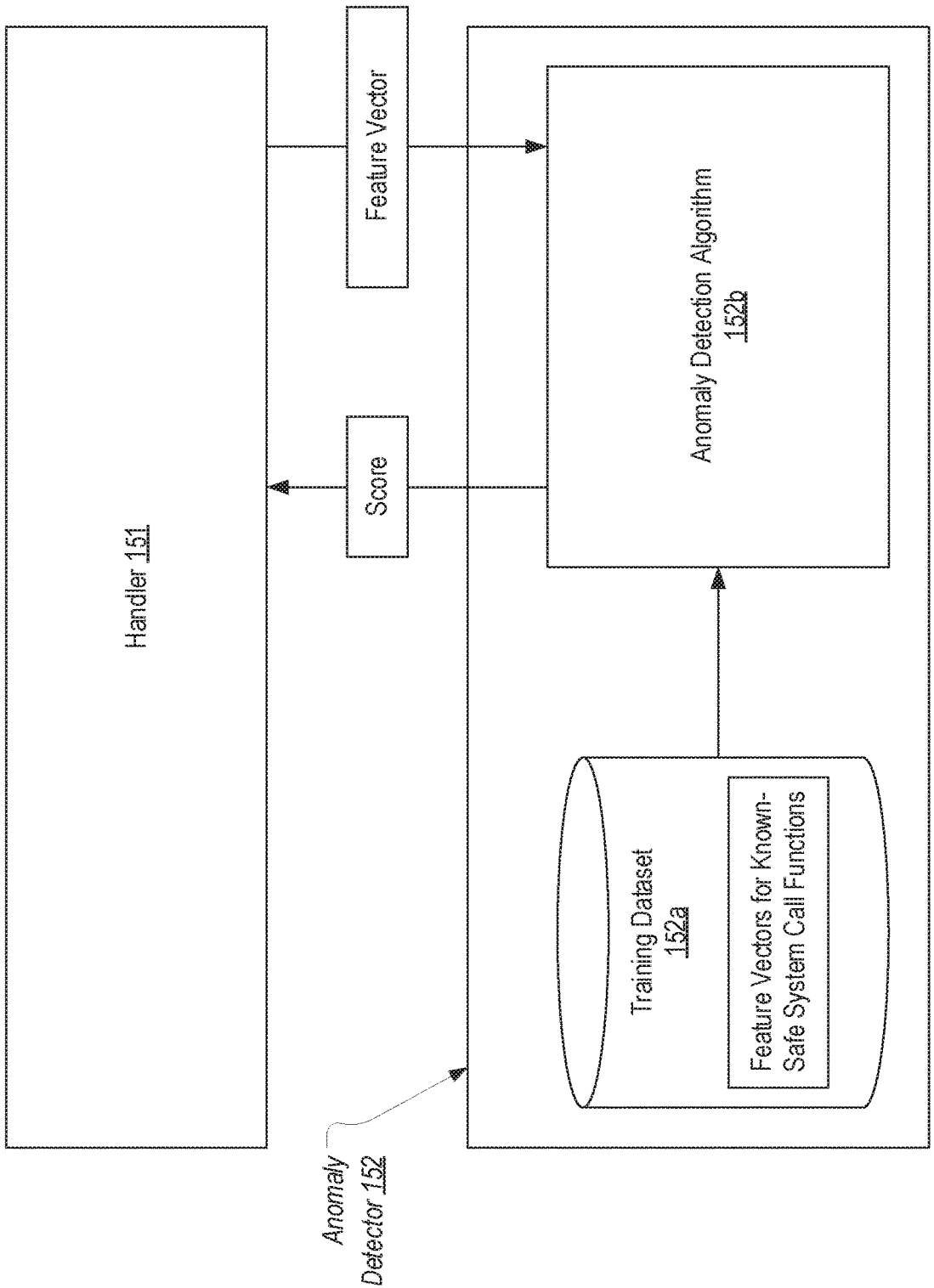
FIG. 4 provides an example of how an anomaly detector of a malware detection engine could be configured in one or more embodiments of the present invention.

FIG. 4 provides an example of how anomaly detector 152 may be configured. As shown, anomaly detector 152 can include a training dataset 152a that maintains feature vectors for known-safe system call functions and an anomaly detection algorithm 152b that is trained using the feature vectors in training dataset 152a. In some embodiments, training dataset 152a can be built and refined by employing malware detection engine 150 to generate the feature vectors while monitoring the execution of known-safe system call functions on a variety of systems.

Anomaly detection algorithm 152b can represent any machine learning algorithm that is capable of detecting whether a feature vector is anomalous in comparison to the feature vectors for known-safe system call functions in training dataset 152a. For example, anomaly detection algorithm 152b could be a multidimensional anomaly detection algorithm such as the Local Outlier Factor (LOF) algorithm. Anomaly detection algorithm 152b can be configured to receive a feature vector from handler 151 as an input and can output a score which indicates whether the feature vector is anomalous. For example, anomaly detection algorithm 152b may output a positive score (e.g., 1) when the input feature vector is not anomalous and a negative score (e.g., −1) when the input feature vector is anomalous. Using the examples from FIGS. 3A and 3B, training dataset 152a could include a number of feature vectors similar to feature vector 200a (i.e., many instances of feature vector 200a could be generated as sys_open is legitimately called) but likely would not include any feature vectors similar to feature vector 200b since feature vector 200b represents characteristics of a system call function that performs an open in an atypical way. Because anomaly detection algorithm 152b is trained using training dataset 152a, it would therefore likely determine that feature vector 200b is anomalous based primarily on the fact that the values of the number of steps feature and the via library feature deviate from the values of these features in feature vectors that were generated for the known-safe sys_open system call function. Accordingly, the use of feature vectors enables malware detection engine 150 to proactively detect when a system call is handled in an atypical way—an occurrence that may likely be the result of malware being executed on the system.

Figure 5:
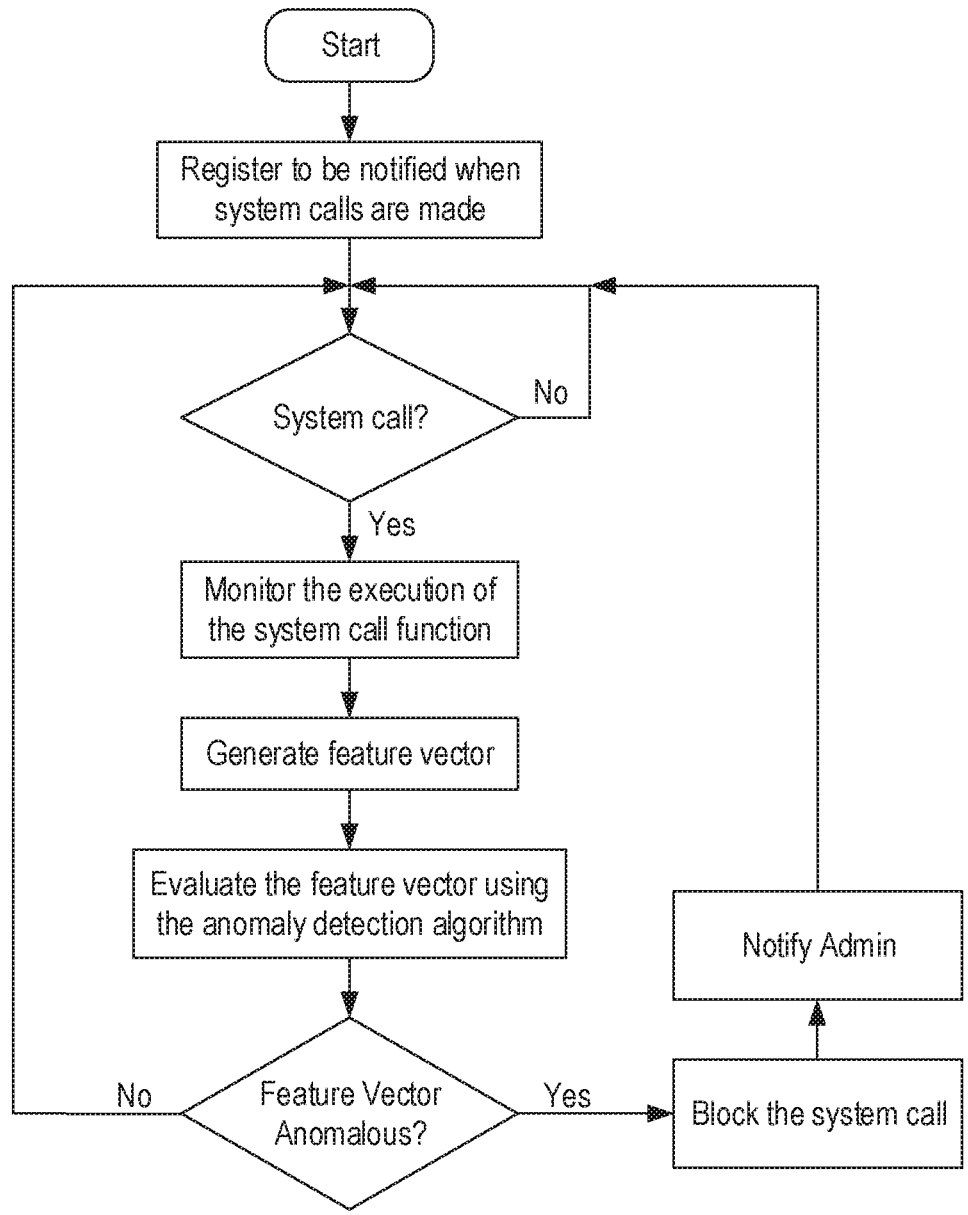
FIG. 5 provides a flow diagram representing functionality that a malware detection engine could perform in accordance with one or more embodiments of the present invention.

FIG. 5 provides a flow diagram that represents functionality that malware detection engine 150 can perform to detect malware. When malware detection engine 150 is executed, it can register to be notified when system calls are made. For example, handler 151 can register one or more probes that cause handler 151 to be notified whenever particular instructions are to be executed, such as instructions that are invoked to handle a system call. Then, when malware detection engine 150 is notified that a system call has been made, it can monitor the execution of the system call function. For example, handler 151 can monitor the execution of the system call function to determine how many steps the system call function performs, to determine a number of delete, open, create, or other operations the system call function performs, to determine whether the system call function employs a library to invoke a known-safe system call function, etc. This monitoring can also entail determining whether the system call was made by a user component, on a new system, or any other characteristic.

In conjunction with monitoring the execution of the system call function, malware detection engine 150 can generate a feature vector for the system call function. For example, handler 151 can populate the values of feature vector 200 or a feature vector with a different set of features. Malware detection engine 150 can then evaluate the feature vector using an anomaly detection algorithm. For example, handler 151 can provide a feature vector to anomaly detection algorithm 152b, and anomaly detection engine 152b can return a score.

Malware detection engine 150 can then determine whether the feature vector is anomalous and take appropriate action. For example, if anomaly detection algorithm 152b returns a score indicating that a feature vector is anomalous, handler 151 can block the system call such as by preventing the system call function from returning. Optionally, malware detection algorithm 150 may notify an administrator when a feature vector is determined to be anomalous. On the other hand, if a feature vector is determined not to be anomalous, malware detection engine 150 may allow the system call to complete.

In summary, embodiments of the present invention may provide a proactive solution for detecting malware by leveraging knowledge of safe system call functionality. Because a malware detection engine configured in accordance with embodiments of the present invention analyzes a single system call relative to known-safe system calls, the malware detection engine can detect malicious functionality even when it is attempted by previously unknown malware.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for detecting malware comprising:
    detecting that a system call has been made, wherein the system call comprises a mechanism by which a user mode object requests that a kernel of an operating system provides a service to the user mode object;
    in response to detecting that the system call has been made, monitoring execution of a system call function that the system call invokes, wherein the system call function comprises code that the kernel of the operating system executes to provide the service to the user mode object;
    in conjunction with monitoring the execution of the system call function, creating a feature vector for the system call function, the feature vector defining a plurality of features of the system call function that are identified while monitoring the execution of the system call function;
    evaluating the feature vector for the system call function using a multidimensional anomaly detection algorithm to thereby generate a score indicating whether the feature vector for the system call function is anomalous; and
    when the score indicates that the feature vector for the system call function is anomalous, blocking the system call, whereas when the score indicates that the feature vector for the system call function is not anomalous, allowing the system call.

2. The method of claim 1, wherein the plurality of features of the feature vector includes a number of steps feature.

3. The method of claim 2, wherein the number of steps feature identifies a number of system call functions that are invoked during execution of the system call function.

4. The method of claim 1, wherein the plurality of features of the feature vector includes one or more count features.

5. The method of claim 4, wherein the one or more count features include one or more of:
    a delete count feature that identifies a number of delete operations the system call function performs;
    an open count feature that identifies a number of open operations the system call function performs; or
    a create count feature that identifies a number of create operations the system call function performs.

6. The method of claim 1, wherein the plurality of features of the feature vector includes a via library feature that identifies whether the system call function uses a library to invoke a known-safe system call function.

7. The method of claim 1, wherein the feature vector includes a by user feature that identifies whether the system call is made by a user component.

8. The method of claim 1, wherein the plurality of features of the feature vector includes a new system feature that identifies whether a system on which the system call is made is new.

9. The method of claim 1, wherein the multidimensional anomaly detection algorithm is trained using feature vectors for known-safe system call functions.

10. The method of claim 1, wherein the multidimensional anomaly detection algorithm is the Local Outlier Factor (LOF) algorithm.

11. The method of claim 1, wherein blocking the system call comprises preventing the system call function from returning successfully.

12. The method of claim 1, wherein detecting that the system call has been made comprises:
    registering one or more probes; and
    associating a handler with the one or more probes.

13. The method of claim 1, wherein the plurality of features of the system call function comprise:
    a number of steps feature;
    a delete count feature;

an open count feature;
a create count feature;
a by user feature;
a new system feature; and
a via library feature.

14. One or more computer storage media storing computer executable instructions which when executed implement a method for detecting malware comprising:
   detecting that a system call has been made, wherein the system call comprises a mechanism by which a user mode object requests that a kernel of an operating system provides a service to the user mode object;
   in response to detecting that the system call has been made, monitoring execution of a system call function that the system call invokes, wherein the system call function comprises code that the kernel of the operating system executes to provide the service to the user mode object;
   in conjunction with monitoring the execution of the system call function, creating a feature vector for the system call function, the feature vector defining a plurality of features of the system call function that are identified while monitoring the execution of the system call function;
   evaluating the feature vector for the system call function using a multidimensional anomaly detection algorithm to thereby generate a score indicating whether the feature vector for the system call function is anomalous; and
   when the score indicates that the feature vector for the system call function is anomalous, blocking the system call, whereas when the score indicates that the feature vector for the system call function is not anomalous, allowing the system call.

15. The computer storage media of claim 14, wherein the plurality of features of the feature vector includes a number of steps feature.

16. The computer storage media of claim 15, wherein the number of steps feature identifies a number of system call functions that are invoked during execution of the system call function.

17. The computer storage media of claim 14, wherein the plurality of features of the feature vector includes one or more count features.

18. The computer storage media of claim 14, wherein the plurality of features of the feature vector includes a via library feature that identifies whether the system call function uses a library to invoke a known-safe system call function.

19. The computer storage media of claim 14, wherein the feature vector includes a by user feature that identifies whether the system call is made by a user component.

20. The computer storage media of claim 14, wherein the plurality of features of the feature vector includes a new system feature that identifies whether a system on which the system call is made is new.

* * * * *